United States Patent
Ayriss et al.

(10) Patent No.: US 10,239,669 B2
(45) Date of Patent: Mar. 26, 2019

(54) CUP LID

(71) Applicant: Dutchwear, LLC, Grants Pass, OR (US)

(72) Inventors: Levi Jacob Ayriss, Medford, OR (US); Jason Dean Hanlin, Eagle Point, OR (US); Shane Alexander Patton, Grants Pass, OR (US); Thomas Joseph Spagnolo, Grants Pass, OR (US); Justin Grady Woolf, Grants Pass, OR (US); Lyu Zhong Guang, Ningbo (CN)

(73) Assignee: Dutchwear, LLC, Grants Pass, OR (US)

( * ) Notice: Subject to any disclaimer, the term of this patent is extended or adjusted under 35 U.S.C. 154(b) by 83 days.

(21) Appl. No.: 15/388,637

(22) Filed: Dec. 22, 2016

(65) Prior Publication Data

US 2018/0170630 A1 Jun. 21, 2018

(30) Foreign Application Priority Data

Dec. 19, 2016 (CN) .......................... 2016 1 1177274

(51) Int. Cl.
| | |
|---|---|
| *B65D 47/08* | (2006.01) |
| *A47G 19/22* | (2006.01) |
| *B65D 43/02* | (2006.01) |
| *B65D 47/32* | (2006.01) |

(52) U.S. Cl.
CPC ..... *B65D 47/0857* (2013.01); *A47G 19/2272* (2013.01); *B65D 43/0225* (2013.01); *B65D 47/32* (2013.01); *B65D 2543/00046* (2013.01); *Y02W 30/807* (2015.05)

(58) Field of Classification Search
CPC ........... B65D 2543/00046; B65D 2543/00092; B65D 47/0895; A47G 19/2272
USPC ........................................................ 220/713
See application file for complete search history.

(56) References Cited

U.S. PATENT DOCUMENTS

| | | | | |
|---|---|---|---|---|
| 5,088,614 A | * | 2/1992 | Dumestre | .......... B65D 43/0212 |
| | | | | 220/254.3 |
| 5,253,781 A | | 10/1993 | Van Melle et al. | |
| 8,276,776 B2 | * | 10/2012 | Roth | ....................... A47G 19/22 |
| | | | | 220/254.1 |
| 2006/0043091 A1 | * | 3/2006 | Pinelli | ................ A47G 19/2272 |
| | | | | 220/254.3 |
| 2014/0048549 A1 | * | 2/2014 | Wille | ................. B65D 43/0222 |
| | | | | 220/713 |

(Continued)

*Primary Examiner* — Shawn M Braden
(74) *Attorney, Agent, or Firm* — Klarquist Sparkman, LLP

(57) ABSTRACT

A reusable lid includes a main body, a spout portion, and a sealing member. The main body has a first surface. The spout portion extends outwardly from the first surface of the main body and has a second surface that is substantially parallel to the first surface and has an opening formed therein. The sealing member has a base portion, a cap portion with a third surface, and an intermediate portion disposed between the base portion and the cap portion. The sealing member is movable relative to the main body and the spout portion between a first orientation and a second orientation. In the first orientation, the cap portion engages the second surface to seal the opening and the third surface is substantially parallel to the first and second surfaces, and in the second orientation, the opening is unobstructed by the cap portion and the third surface is non-parallel to the first and second surfaces.

18 Claims, 7 Drawing Sheets

(56) References Cited

U.S. PATENT DOCUMENTS

2016/0264312 A1* 9/2016 Choltco-Devlin ............................ B65D 47/0895

* cited by examiner

CUP LID

CROSS REFERENCE TO RELATED APPLICATION

This application claims priority to Chinese Application No. 201611177274.3, filed on Dec. 19, 2016.

FIELD

This disclosure relates generally to container lids and, more particularly, to reusable, sealable lids for beverage containers.

BACKGROUND

Lids for beverage containers, especially travel mugs, are widely used to prevent the contents of a container from inadvertently spilling. Despite their proliferation, typical lids suffer from one or more problems including ineffective sealing, difficulty of use, and inadequate venting, to name a few. As such, improved lids for beverage containers are always desirable.

SUMMARY

Described herein are exemplary embodiments of reusable lids that can be attached to fluid containers, such as containers for drinkable beverages, including travel mugs. In some embodiments, a lid can be configured such that a user can selectively move the lid between an open or unsealed orientation, which allows the user to drink the beverage through the lid, and a closed or sealed orientation, which prevents the beverage from undesirably spilling from the container.

In one representative embodiment, a reusable lid for a beverage container comprises a main body, a spout portion, and a sealing member. The main body has a first surface, a cap-receiving recess, a base-receiving recess, and a vent, wherein the cap-receiving recess comprises a detent, and the vent comprises a plurality of apertures and is disposed within the base-receiving recess. The spout portion has a drink-through opening and a second surface, wherein the spout portion extends outwardly from the first surface of the main body, and the second surface is substantially parallel to the first surface. The sealing member has a base portion, a cap portion, and an intermediate portion, wherein the base portion is pivotably coupled to the main body, the cap portion includes a plug member and a third surface, and the intermediate portion includes a projection and is disposed between the base portion and the cap portion. The sealing member is pivotable relative to the main body and the spout portion between sealed and open orientations. When the sealing member is in the sealed orientation, the plug member extends into and seals the drink-through opening, the third surface is substantially parallel to the first and second surfaces, and the base portion is disposed in the base-receiving recess and contacts the vent such that the base portion seals the vent. When the sealing member is in the open orientation, the drink-through opening is unobstructed by the plug member, the cap portion is disposed in the cap-receiving recess, the projection protrudes into the detent to retain the sealing member in the open orientation, and the third surface is non-parallel to the first and second surfaces.

In another representative embodiment, a reusable lid comprises a main body, a spout portion, and a sealing member. The main body has a first surface. The spout portion extends outwardly from the first surface of the main body and has a second surface that is substantially parallel to the first surface and has an opening formed therein. The sealing member has a base portion, a cap portion with a third surface, and an intermediate portion disposed between the base portion and the cap portion. The sealing member is movable relative to the main body and the spout portion between a first orientation and a second orientation. In the first orientation, the cap portion engages the second surface to seal the opening and the third surface is substantially parallel to the first and second surfaces, and in the second orientation, the opening is unobstructed by the cap portion and the third surface is non-parallel to the first and second surfaces.

In some embodiments, the cap portion has a projection extending therefrom, and the projection is configured to extend into and seal the opening when the sealing member is in the first orientation.

In some embodiments, the main body comprises a recess formed therein, and wherein the recess is configured to receive at least a portion of the cap portion when the sealing member is in the second orientation. In some embodiments, the recess comprises fourth and fifth surfaces that are non-parallel to the first and second surfaces. In some embodiments, the recess has a detent formed therein, and the intermediate portion of the sealing member comprises a projection extending therefrom that engages with the detent when the sealing member is in the second orientation to selectively to retain the sealing member in the second orientation. In some embodiments, the main body has an annular side surface that is substantially perpendicular to the first surface, and wherein the spout portion is disposed adjacent to a first portion of the side surface, and the recess is disposed adjacent to a second portion of the side surface circumferentially opposite the first portion.

In some embodiments, the recess is a first recess, and the main body further comprises a second recess extending from the first recess to the spout portion, and wherein the second recess is configured to receive the base portion of the sealing member when the sealing member is in the first orientation. In some embodiments, the second recess comprises a sixth surface that is substantially parallel to the first and second surfaces.

In some embodiments, the main body further comprises a vent disposed in the second recess, and the base portion of the sealing member engages the vent to seal the vent when the sealing member is in the first orientation. In some embodiments, the vent is spaced from the spout portion toward the second recess. In some embodiments, the vent comprises a central opening with one or more arcuate slits spaced from the central opening. In some embodiments, the arcuate slits are spaced outwardly from the central opening.

In some embodiments, the sealing member is pivotably coupled to the main body by one or more pivot pins. In some embodiments, the sealing member, main body, and spout portion are integrally formed from a single, unitary piece of material.

In some embodiments, the spout portion has an elliptical cross-sectional profile taken in a plane perpendicular to a longitudinal axis of the spout portion. In some embodiments, the spout portion has a frustoconical cross-sectional profile taken in a plane parallel to the longitudinal axis of the spout portion. In some embodiments, the intermediate portion extends from the base portion to the cap portion at an angle, and the angle is configured such that the intermediate portion is flush with the spout portion when the sealing member is in the first orientation. In some embodiments, an annular inner surface of the spout portion that defines the opening is radially tapered such that a portion of the inner surface disposed adjacent to the second surface is radially larger than a portion of the inner surface spaced from the second surface.

In another representative embodiment, a reusable lid for a beverage container comprises a main body and a sealing member. The main body has a raised nipple and a central recess. The sealing member is pivotally connected to the main body for pivoting about a pivot axis located substantially within the central recess. The raised nipple includes a first surface having a drink-through opening, and the sealing member has a second surface sealingly compatible with the first surface. The sealing member is pivotable between a first orientation in which the first and second surfaces are in substantially parallel engagement to one another and the drink-through opening is sealed and a second orientation in which the first and second surfaces are not parallel to one another and the drink-through opening is exposed.

In some embodiments, the pivot axis is located centrally on the main body so that the second surface pivots from one side of the lid proximate to the nipple to an opposite side of the lid. In some embodiments, the recess includes a deeper recess portion on a side of the lid opposite the nipple to receive the second surface of the sealing member in the second orientation. In some embodiments, the deeper recess portion has a geometry compatible with the second surface such that at least a portion of the second surface rests within the deeper recess when the sealing member is in the second orientation.

In some embodiments, the sealing member has a step orientation, which includes the second surface, a leg portion and bridge portion interconnecting the second surface and leg portion. In some embodiments, the second surface has a plug portion extending therefrom adapted to plug the drink-through opening in the first orientation.

In some embodiments, the lid can have one or more of the above features separately or in all possible combinations with each other.

The foregoing and other objects, features, and advantages of the disclosure will become more apparent from the following detailed description, which proceeds with reference to the accompanying figures.

DETAILED DESCRIPTION

Figure 1:
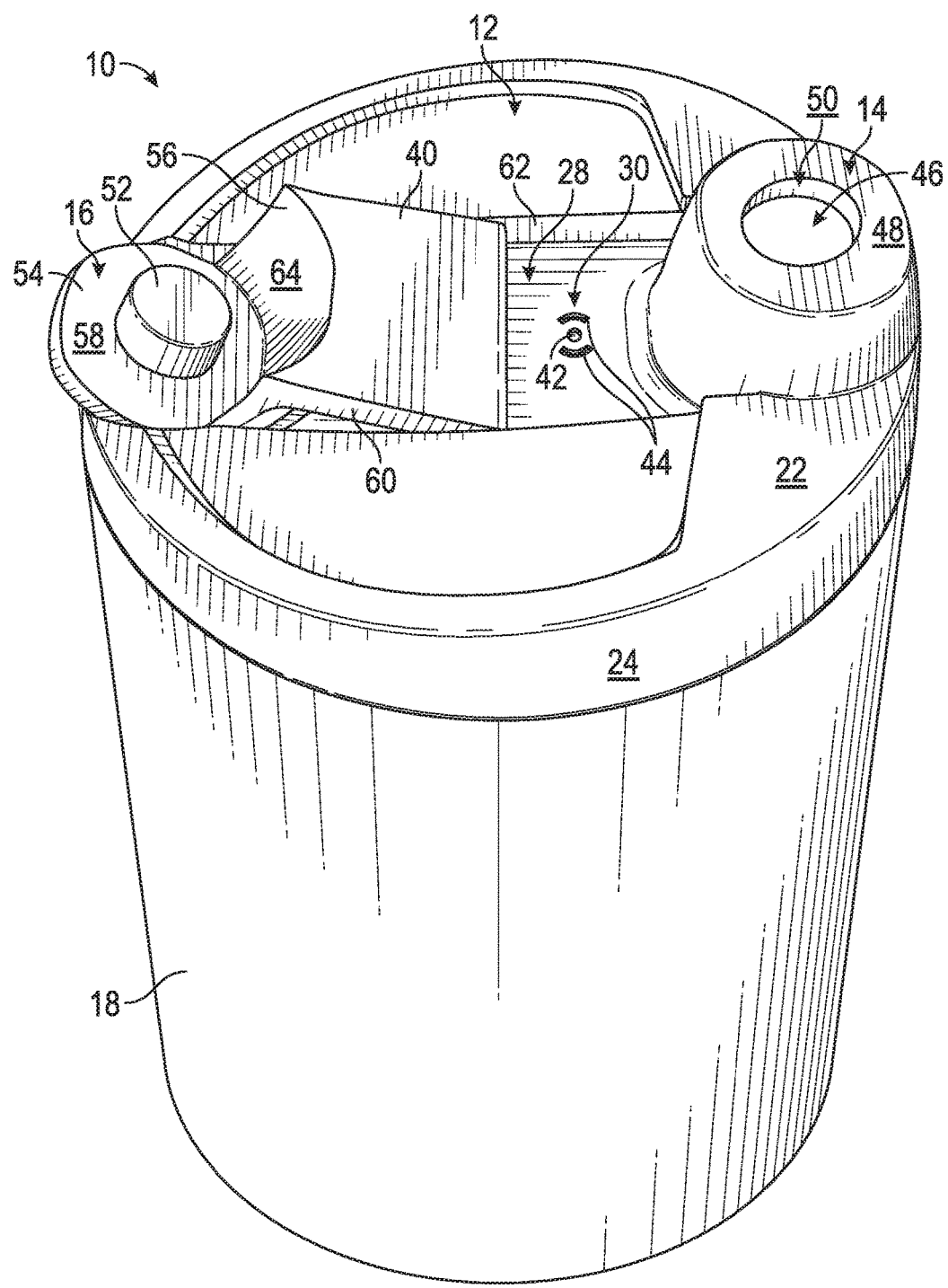
FIG. 1 is a perspective view of an exemplary embodiment of container and a cup lid with a sealing member of the cup lid in an open orientation and attached to a container.
Figure 2:
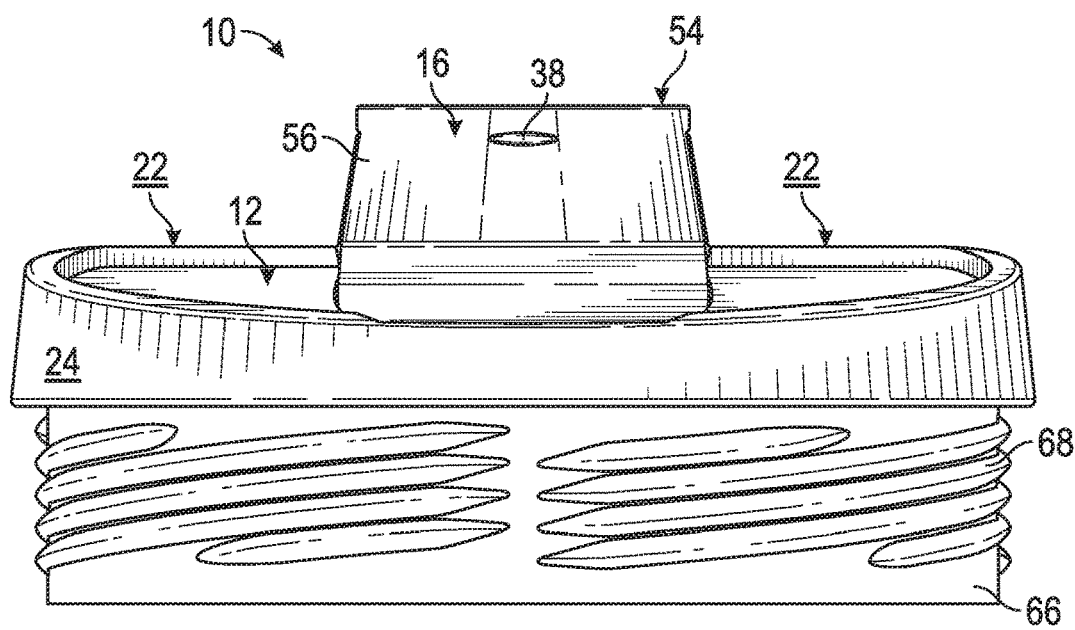
FIG. 2 is a rear elevation view of the cup lid of FIG. 1.
Figure 3:
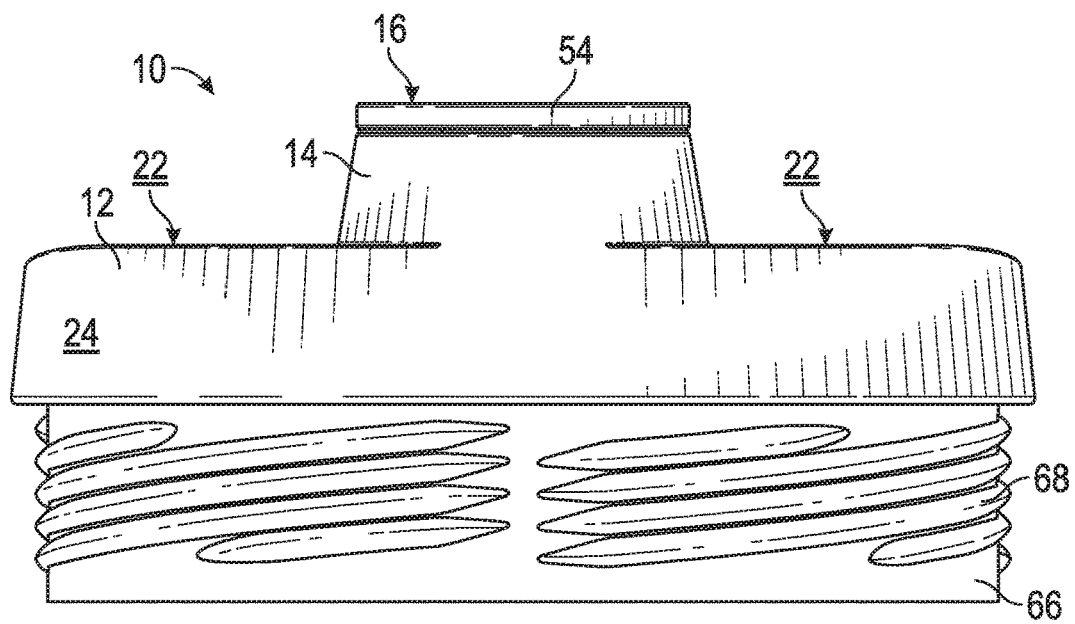
FIG. 3 is a front elevation view of the cup lid of FIG. 1.

For purposes of this description, certain aspects, advantages, and novel features of the embodiments of this disclosure are described herein. The described methods, systems, and apparatus should not be construed as limiting in any way. Instead, the present disclosure is directed toward all novel and nonobvious features and aspects of the various disclosed embodiments, alone and in various combinations and sub-combinations with one another. The disclosed methods, systems, and apparatus are not limited to any specific aspect, feature, or combination thereof, nor do the disclosed methods, systems, and apparatus require that any one or more specific advantages be present or problems be solved.

Features, integers, characteristics, or groups described in conjunction with a particular aspect, embodiment or example are to be understood to be applicable to any other aspect, embodiment or example described herein unless incompatible therewith. All of the features disclosed in this specification (including any accompanying claims, abstract, and drawings), and/or all of the steps of any method or process so disclosed, may be combined in any combination, except combinations where at least some of such features and/or steps are mutually exclusive. The disclosure is not restricted to the details of any foregoing embodiments. The disclosure extends to any novel one, or any novel combination, of the features disclosed in this specification (including any accompanying claims, abstract, and drawings), or to any novel one, or any novel combination, of the steps of any method or process so disclosed.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods, systems, and apparatus can be used in conjunction with other systems, methods, and apparatus.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

The explanations of terms and abbreviations herein are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

As used herein, the term "and/or" used between the last two of a list of elements means any one or more of the listed elements. For example, the phrase "A, B, and/or C" means "A," "B," "C," "A and B," "A and C," "B and C," or "A, B, and C."

As used herein, the term "coupled" generally means physically coupled or linked and does not exclude the presence of intermediate elements between the coupled items absent specific contrary language.

As used herein, the term "parallel" means the planes extending from the object do not intersect. As used herein, the term "substantially parallel" means that planes extending from the objects intersect at an angle less than or equal to 10 degrees. As used herein, the term "perpendicular" means the planes extending from the object intersect at 90 degrees. As used herein, the term "substantially perpendicular" means that planes extending from the objects intersect at an angle between 80-100 degrees, inclusive.

Described herein are exemplary embodiments of reusable lids that can be attached to fluid containers, such as containers for drinkable beverages including travel mugs. In some embodiments, the lids can be configured to be used with hot and/or cold beverages, such as coffee, tea, soda, water, etc. In some embodiments, a lid can be configured such that a user can selectively move the lid between (e.g., to and from) an open or unsealed orientation, which allows the user to drink the beverage through the lid, and a closed or sealed orientation, which prevents the beverage from undesirably spilling from the container. These and other features of the lids are further explained below.

FIGS. 1-9 show an exemplary embodiment of a reusable lid 10. The lid 10 can be moved from an open or unsealed orientation (FIG. 1) to a closed or sealed orientation (e.g., FIG. 8), and vice versa. Referring to FIG. 1, the lid 10 can comprise three main components, a main body 12, a spout or nipple portion 14, and a sealing member 16. The main body 12 can be configured to releasably and securely connect to a container 18 and to cover an open-end portion 20 of the container 18. The spout portion 14 can be coupled to and extend outwardly (i.e., upwardly in the orientation shown in FIG. 1) away from the main body 12 and can allow fluid to pass through lid 10. The sealing member 16 can be movably coupled to the main body 12 and configured to selectively seal or plug the spout portion 14. At least the main body 12 and the spout portion 14 can be integrally formed by thermoforming such as thin gauge thermoforming, injection molding, or other suitable methods of forming polymeric parts.

The main body 12 can include an upper surface 22, a side surface 24, a cap-receiving recess 26 (FIG. 8), a base-receiving recess or groove 28, and a vent 30. The upper surface 22 can be disposed adjacent to and at least partially surround the spout portion 14. The side surface 24 can extend annularly, circumscribing the main body 12. In some embodiments, the side surface 24 can be perpendicular or at least substantially perpendicular to the upper surface 22. The cap-receiving recess 26 can be configured to receive at least a portion of the sealing member 16 when the sealing member 16 is in the open orientation.

Figure 8:
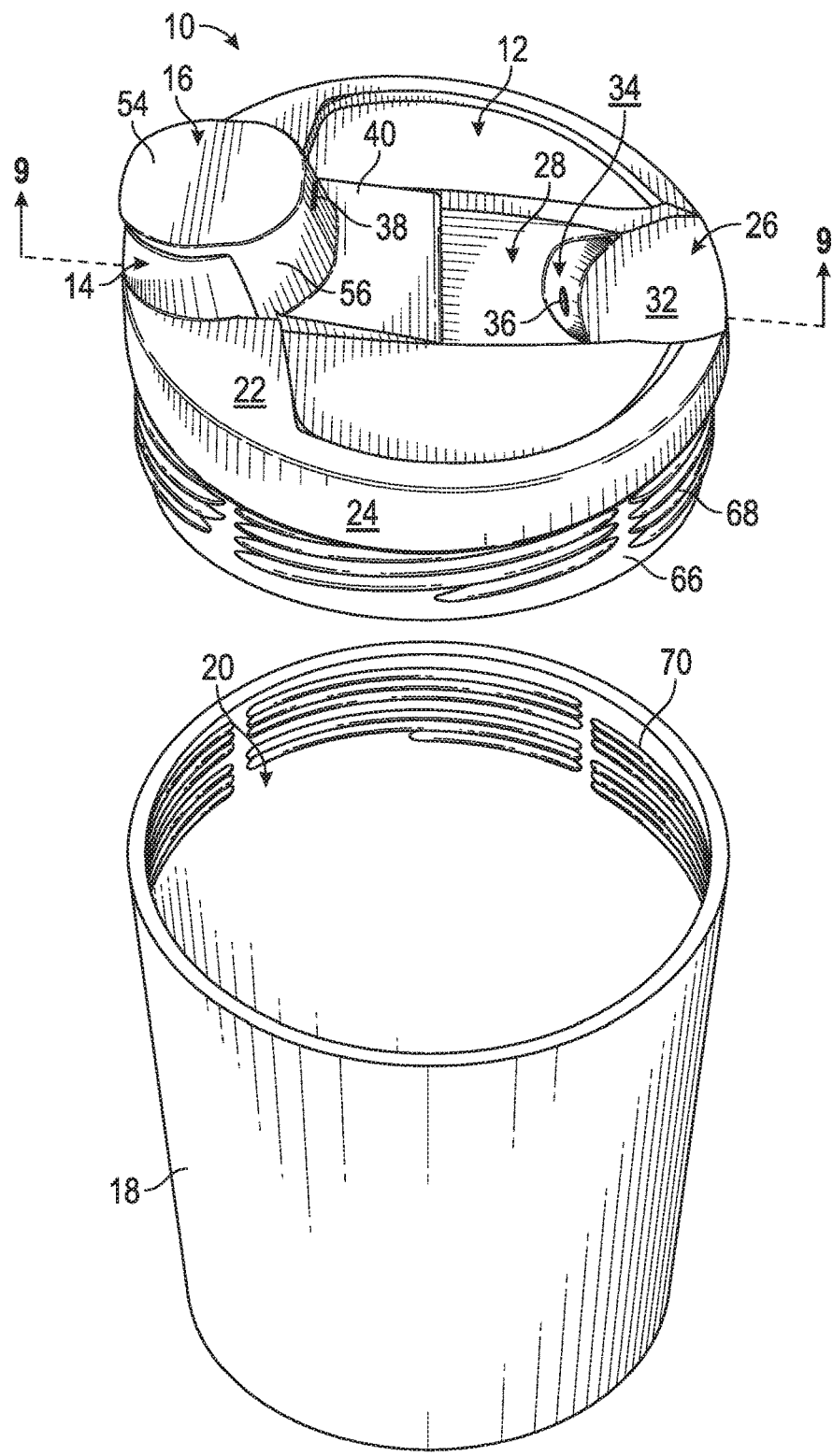
FIG. 8 is an exploded perspective view of the container and the cup lid of FIG. 1 with the sealing member of the cup lid in a closed orientation.

Referring to FIG. 8, the cap-receiving recess 26 can extend inwardly (i.e., downwardly in the orientation shown in FIG. 8 and generally opposite from the direction in which the spout portion 14 extends) from the upper surface 22 toward the container 18. The cap-receiving recess 26 can comprise first and second surfaces 32, 34 that can be configured to engage the sealing member 16 when the lid is in the open orientation, as best shown in FIG. 1. The cap-receiving recess 26 has a size and geometry compatible with at least a portion of the sealing member 16 to allow the sealing member 16 to mate or nest within the cap-receiving recess 26 when seated therein.

Figure 9:
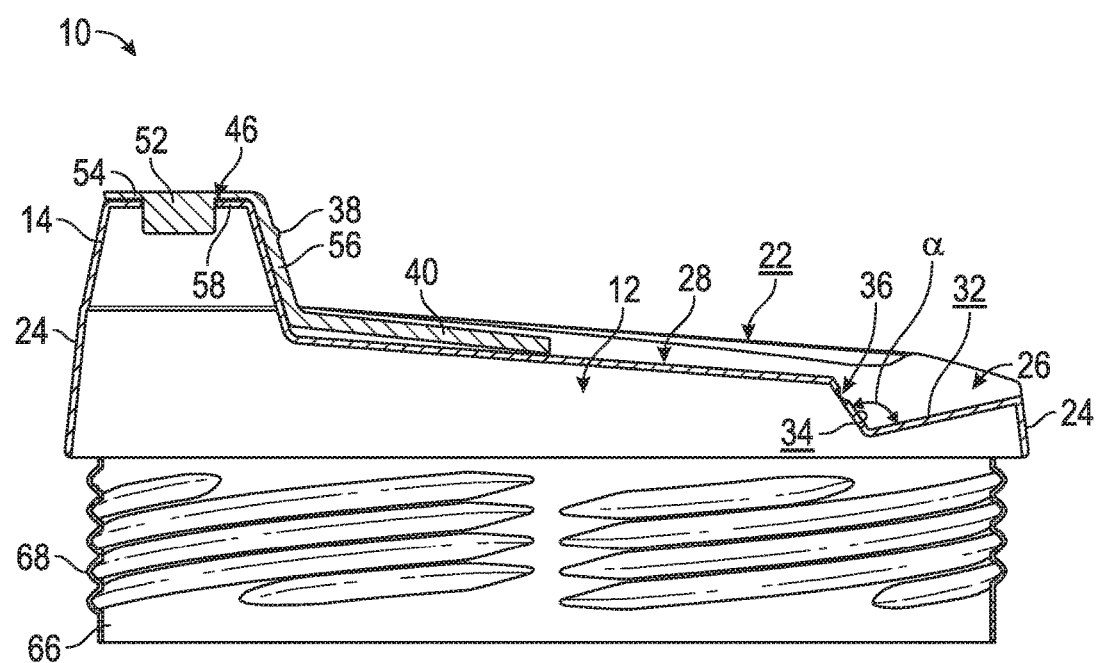
FIG. 9 is a cross-sectional view of the cup lid of FIG. 1 with the sealing member in the closed orientation, taken along the line 9-9 shown in FIG. 8.

Referring to FIG. 9, the first and second surfaces 32, 34 of the cap-receiving recess 26 can insect with each other at an angle $\alpha$. In some embodiments, the angle $\alpha$ can be between 0-180 degrees, exclusive. In other embodiments, the angle $\alpha$ can be between 35-145 degrees or between 110-135 degrees, inclusive. In one particular embodiment, the angle $\alpha$ can be 130 degrees. In some embodiments, the first and second surfaces 32, 34 can be non-parallel to the upper surface 22. In other embodiments, the first surface 32 can be parallel or at least substantially parallel to the upper surface 22 and/or the second surface 34 can be perpendicular or at least substantially perpendicular to the upper surface 22.

Figure 6:
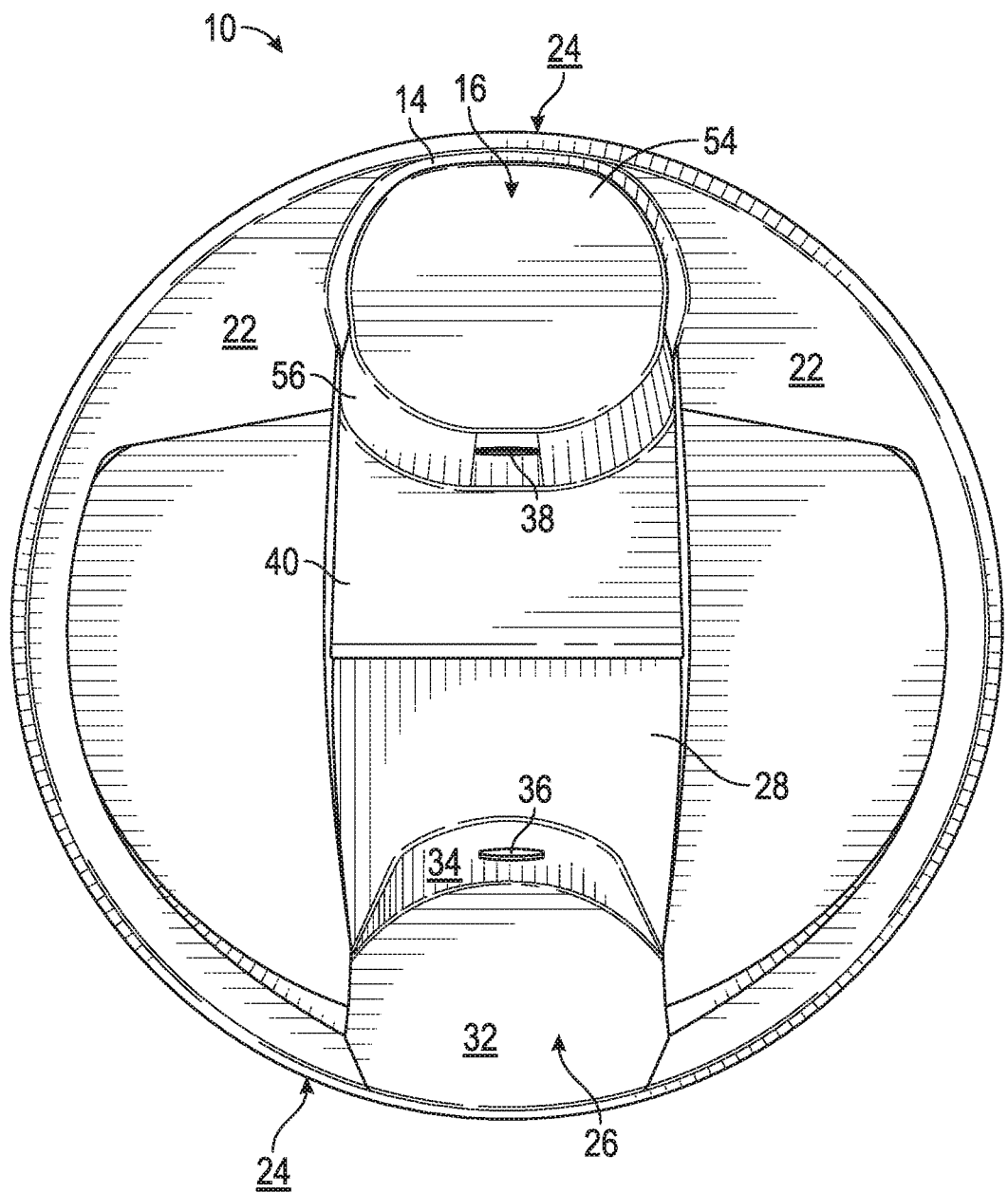
FIG. 6 is a top plan view of the cup lid of FIG. 1.
Figure 7:
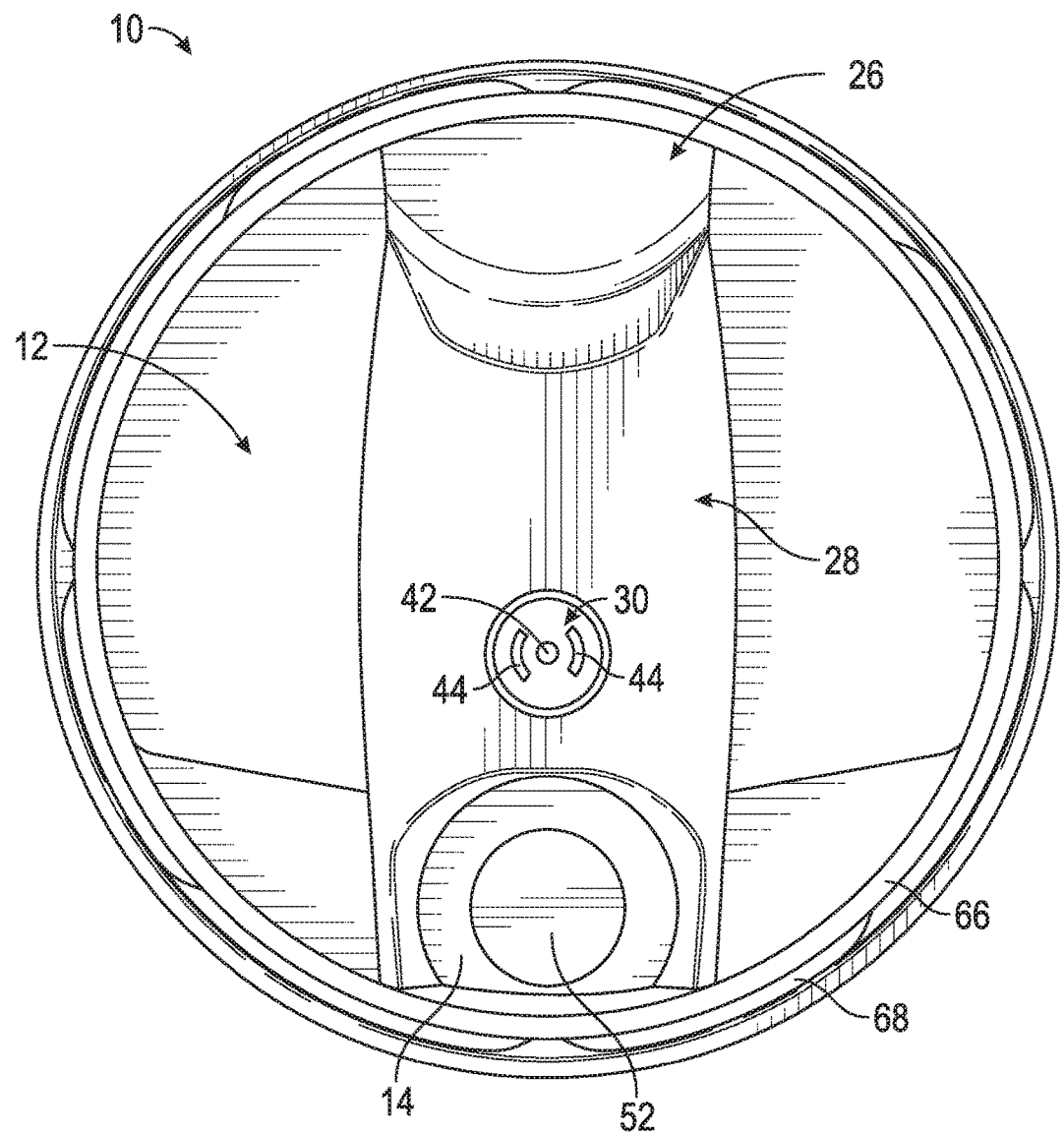
FIG. 7 is a bottom plan view of the cup lid of FIG. 1.

In some embodiments, the cap-receiving recess 26 can include a securing feature configured to engage and retain the sealing member 16 in the open orientation. In particular embodiments, the cap-receiving recess 26 and the sealing member 16 can comprise complementary mating features (e.g., male/female). For example, as best shown in FIGS. 6, and 8, the second surface 34 of the cap-receiving recess 26 can comprise a detent 36 that is configured to engage a compatible projection 38 of the sealing member 16.

Figure 4:
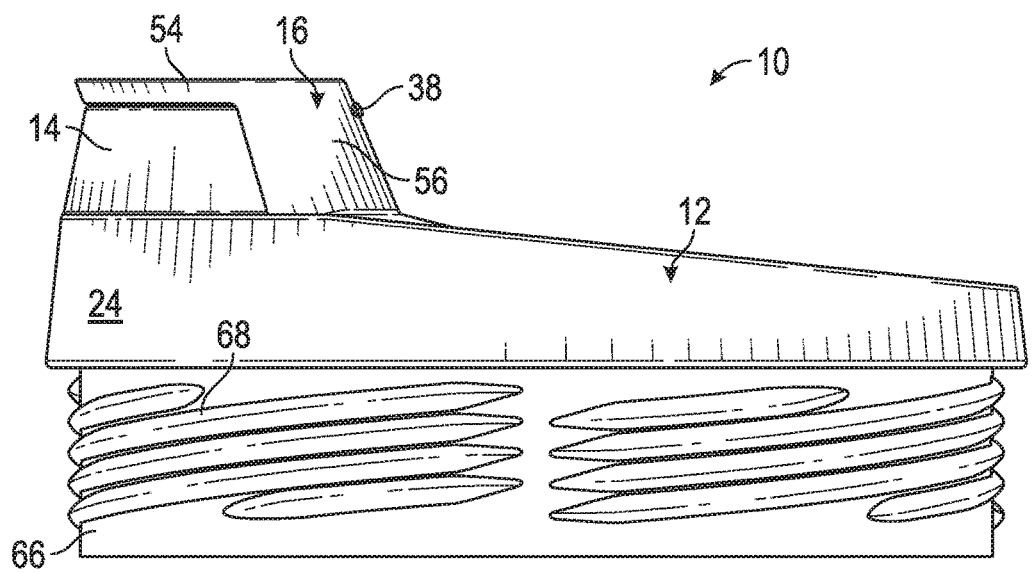
FIG. 4 is a side elevation view of the cup lid of FIG. 1.
Figure 5:
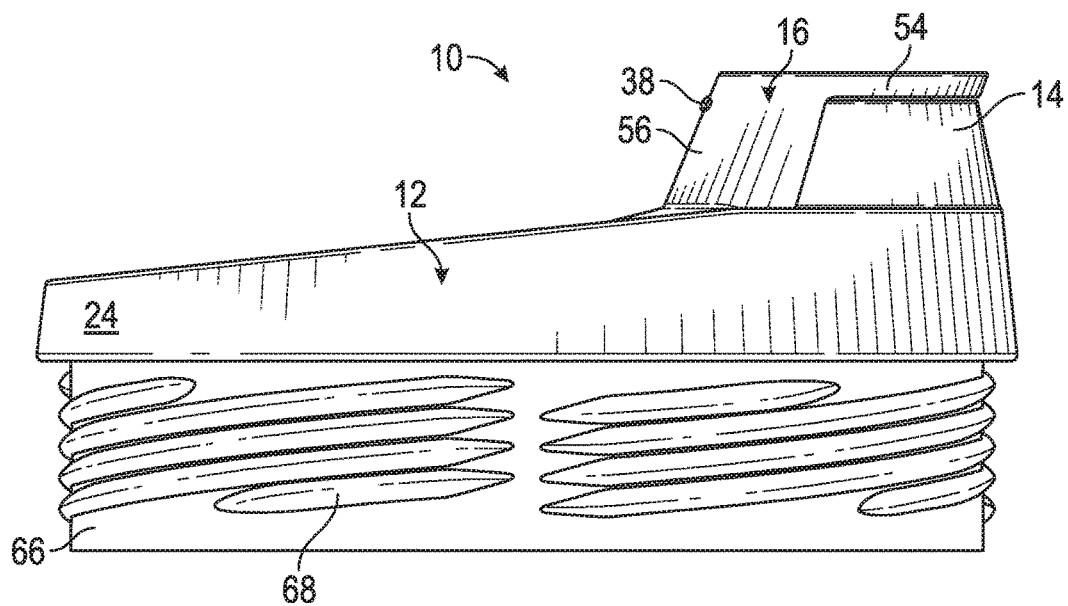
FIG. 5 is an opposite side elevation view of the cup lid of FIG. 1.

In some embodiments, the base-receiving recess 28 can extend from the spout portion 14 to the cap-receiving recess 26, as best shown in FIG. 9. In this manner, the recesses 26, 28 can be characterized as a large, single recess with the cap-receiving recess forming a deeper recess portion of the single recess. Referring to FIGS. 4-5 and 9, the base-receiving recess 28 can be configured such that at least part of a base portion 40 of the sealing member is flush or below the upper surface 22 of the main body 12 when the sealing member 16 is in the closed orientation.

Referring to FIG. 1, the vent 30 can be configured to allow air to pass through the lid 10 and into the container 18 when fluid is flowing out of the spout portion 14. This improves flow through the spout portion 14. The vent 30 can comprise one or more openings or apertures. For example, in the illustrated embodiment, the vent 30 comprises one central opening 42 and two arcuate slits 44 disposed radially outwardly from the central opening 42. This particular vent configuration can, for example, advantageously prevent fluid from leaking through the vent 30 when the sealing member 16 is in the sealed orientation and can also allow air to enter the vent 30 (thus improving flow of the fluid) when the sealing member 16 is in the unsealed configuration. In other embodiments, various other configurations of openings and/or slits can be used. In some embodiments, the vent 30 can be disposed in the base-receiving recess 28. This allows the base portion 40 of the sealing member 16 to engage or contact, and thus seal, the vent 30 when the sealing member 16 is in the closed orientation, as further explained below.

Referring still to FIG. 1, the spout portion 14 can extend outwardly away from the upper surface 22 of the main body 12 (as mentioned above). As best shown in FIGS. 6 and 9, the spout portion 14 can be disposed adjacent to one end of the side surface 24 that is circumferentially opposite another end of the side surface 24 adjacent to the cap-receiving recess 26.

The spout portion 14 can have a drink-through opening 46 extending through an end surface 48 of the spout portion 14 and being defined by an annular inner surface 50. The end surface 48 can be parallel or at least substantially parallel to the upper surface 22 of the main body 12 but raised relative to the upper surface 22.

In some embodiments, the spout portion 14 can have an elliptical cross-sectional profile taken in a plane perpendicular to a longitudinal axis of the spout portion 14, as best shown in FIG. 1. The elliptical profile of the spout portion 14 can be configured to correspond to the elliptical shape of a user's mouth. In other embodiment, various other cross-sectional profiles can be used (e.g., circular, rectangular, etc.).

As best shown in FIGS. 4 and 9, in some embodiments, the spout portion 14 can have a frustoconical cross-sectional profile taken in a plane parallel to the longitudinal axis of the spout portion 14. This cross-sectional profile can improve mating between a correspondingly-shaped sealing member 16. This is because the widest portion of the sealing member 16 moves first over the narrowest portion (i.e., the portion adjacent to the end surface 48 shown in FIG. 1) when the sealing member is moving from the open orientation (e.g., FIG. 1) to the closed orientation (e.g., FIG. 8). This cross-sectional profile can also improve mating with the user's mouth.

Referring to FIG. 1, in some embodiments, the inner surface 50 can also comprise frustoconical shape. In other words, the inner surface 50 can be radially tapered such that a portion of the inner surface 50 disposed adjacent to the end surface 48 is radially larger than a portion of the inner surface 50 spaced from the end surface 48. This can improve mating and sealing between the inner surface 50 and a plug member 52 of the sealing member 16, as further explained below.

Referring to FIG. 8, the sealing member 16 can include the base portion 40, a cap portion 54, and an intermediate or bridge portion 56. The base portion 40 can be movably (e.g., pivotably) coupled to the main body 12 (e.g., within the base-receiving recess 28). The cap portion 54 can include the plug member 52 that protrudes away from a bottom surface 58. The intermediate portion 56 includes the projection 38 and is disposed between the base portion 40 and the cap portion 54. In some embodiments, the intermediate portion 56 can have an arcuate surface that matingly corresponds to and engages a portion of the outer frustoconical surface of the spout 14.

The base portion 40 can be movably coupled to the main body 12 in various ways. For example, the base portion can comprise an opening or receptacle (not shown) that is configured to receive a pivot element (not shown) (e.g., a shaft or pin). The pivot element can protrude beyond one or both side portions 60 of the base portion 40 and can, for example, pivotably engage side walls 62 of the base-receiving recess 28 such that the sealing member 12 pivots about a pivot axis defined by a longitudinal axis of the pivot element. In other embodiments, the base portion 40 can be integrally formed with the main body 12, and the base portion 40 can be formed from a sufficiently flexible and resilient material (e.g., silicone) such that the base portion 40 can bend or fold at a junction of the base portion 40 and the main body 12.

As such, sealing member 16 can be pivoted relative to the main body 12 and the spout portion 14 between the open orientation (e.g. FIG. 1) and the closed orientation (e.g., FIG. 8). In the open orientation, the drink-through opening 46 is unobstructed by the plug member 52, the cap portion 54 is disposed in the cap-receiving recess 26 contacting the first surface 32 of the cap-receiving recess 26. Also, the intermediate portion 56 contacts the second surface 34 of the cap-receiving member, and the projection 38 of the intermediate portion 56 protrudes into the detent 36 of the second surface 34 to retain the sealing member 16 in the open orientation. In addition, the bottom surface 58 of the cap portion 54 is non-parallel to the upper surface 22 of the main body 12 and the end surface 48 of the spout portion 14. In this way, the cap-receiving recess 26 serves as a storage means to allow the sealing member to be compactly and aesthetically locked in place away from the spout portion 14 when the cup and lid 10 are tilted upwardly for drinking.

In the closed orientation, the bottom surface 58 of the cap portion 54 engages the end surface 48 of the spout portion 14, and the plug member 52 of the cap portion 54 extends into the drink-through opening 46, thereby sealing the drink through opening 46. Also, the bottom surface 58 of the cap portion 54 is parallel or at least substantially parallel to the upper surface 22 of the main body 12 and the end surface 48 of the spout portion 14, and the base portion 40 is nested in the base-receiving recess 28 and contacts, and thus seals, the vent 30.

In some embodiments, the intermediate portion 56 can extend from the base portion 40 to the cap portion 54 at a non-right angle. For example, the intermediate portion 56 can be configured to a non-right angle corresponding to the frustoconical shape of the spout portion 14, as best shown in FIG. 9. This can, for example, allow the intermediate portion 56 to sit flush against spout portion 14 when the sealing member 16 is in the closed orientation.

In some embodiments, the intermediate portion 56 can include a curved inwardly facing surface 64 configured to correspond to the shape (e.g., elliptical) of the spout portion 14, as shown, for example, in FIG. 1. This can, for example, further facilitate a flush connection between the intermediate portion 58 and the spout portion 14 when the sealing member 16 is in the closed orientation, as best shown in FIG. 9. In one example, the surface 64 can engages about ¼ to about ½ of the outer circumference of the spout portion 14.

FIG. 9 also illustrates that the sealing member 16 can have a substantially step-like (or Z-shaped) geometry in which the base portion 40 steps up to the cap portion 54. In one example, the base portion 40 can be inclined relative to a horizontal or reference ground plane, for example, about 0 to 30 degrees or 5 to 25 degrees. The intermediate portion 56 can be inclined relative to the reference ground plane at a steeper angle than the base portion 40, for example, about 60 to about 90 degrees or about 70 to 85 degrees.

Referring to FIG. 1, in some embodiments, the plug member 52 can comprise a frustoconical shape such that a diameter of the plug member 52 increases toward the portion of the plug member 52 that is disposed adjacent to the bottom surface 58 of the cap portion 54. As a result, engagement between the plug member 52 and the inner surface 50 of the spout portion 14 is least when the plug member 52 is initially inserted into the opening 46 and gets progressively increases as the plug member 52 is further inserted into the opening 46 to the point in the bottom surface 58 of the cap portion 54 contacts the end surface 48 of the spout portion 14.

In some embodiments, the cap portion 54 can be sized such that the bottom surface 58 of the cap portion 54 is (or is at least substantially) the same size as the end surface 48 of the spout portion 14. In other embodiments, the cap portion 54 can be sized such that a least a portion of the bottom surface 58 extends radially outwardly beyond the end surface 48. In yet other embodiments, the cup lid 10 can have a grasping element (not shown) (e.g., a tab, loop, etc.) which is coupled to and extends from the cap portion 54. As such, the portion of the bottom surface 58 that extends beyond the end surface 48 and/or the grasping element can provide a user with a location to grab the cap member 54, for example, when moving the sealing member 16 between the sealed orientation and the unsealed orientation.

Referring to FIG. 8, the lid 10 can also comprise an attachment structure 66. The attachment structure 66 can be used to releasably and securely attach the lid 10 to the container 18. In some embodiments, the attachment structure 66 can include threads (e.g., internal or external) that are configured to engage corresponding threads (external or internal) of the container 18. In the illustrated embodiment, for example, the attachment structure 66 of the lid 10 comprises external threads 70 that are configured to engage internal threads 70 of the container 18. In other embodiments, the lid 10 can comprise various other attachment structures, including one or more lips and/or grooves that are configured to engage a container (e.g., to form a "snap-on" type connection or a press-fit connection).

The technologies from any example can be combined with the technologies described in any one or more of the other examples. For example, one or more of the technologies described with respect to one example can be combined with one or more of the technologies described with respect to another example, or vice versa.

In view of the many possible embodiments to which the principles of the disclosure may be applied, it should be recognized that the illustrated embodiments are only examples and should not be taken as limiting the scope of the disclosure. Rather, the scope of the disclosure is defined by the following claims.

What is claimed is:

1. A reusable lid for a beverage container, comprising:
   a main body having a first surface, a cap-receiving recess, a base-receiving recess, and a vent, wherein the cap-receiving recess comprises a detent, and the vent comprises a plurality of apertures and is disposed within the base-receiving recess;
   a spout portion having a drink-through opening and a second surface, wherein the spout portion extends outwardly from the first surface of the main body, and the second surface is substantially parallel to the first surface; and
   a sealing member having a base portion, a cap portion, and an intermediate portion, wherein the base portion is pivotably coupled to the main body, the cap portion includes a plug member and a third surface, and the intermediate portion includes a projection and is disposed between the base portion and the cap portion,
   wherein the sealing member is pivotable relative to the main body and the spout portion between open and sealed orientations,
   wherein when the sealing member is in the open orientation the drink-through opening is unobstructed by the plug member, the cap portion is disposed in the cap-receiving recess, the projection protrudes into the detent to retain the sealing member in the open orientation, and the third surface is non-parallel to the first and second surfaces, and
   wherein when the sealing member is in the sealed orientation the plug member extends into and seals the drink-through opening, the third surface is substantially parallel to the first and second surfaces, and the base portion is disposed in the base-receiving recess and contacts the vent such that the base portion seals the vent.

2. A reusable lid, comprising:
   a main body having a first surface;
   a spout portion extending outwardly from the first surface of the main body and having a second surface that is substantially parallel to the first surface and has an opening formed therein; and
   a sealing member having a base portion, a cap portion with a third surface, and an intermediate portion disposed between the base portion and the cap portion,
   wherein the sealing member is movable relative to the main body and the spout portion between a first orientation and a second orientation, wherein in the first orientation the cap portion engages the second surface to seal the opening and the third surface is substantially parallel to the first and second surfaces, and in the second orientation the opening is unobstructed by the cap portion and the third surface is non-parallel to the first and second surfaces,
   wherein the main body comprises a first recess and a second recess extending from the first recess to the spout portion, wherein the first recess is configured to receive at least a portion of the cap portion when the sealing member is in the second orientation, wherein the second recess is configured to receive the base portion of the sealing member when the sealing member is in the first orientation, and
   wherein the main body further comprises a vent disposed in the second recess, wherein the base portion of the sealing member engages the vent to seal the vent when the sealing member is in the first orientation, and wherein the vent comprises a central opening with one or more arcuate slits spaced outwardly from the central opening.

3. The lid of claim 2, wherein the cap portion has a projection extending therefrom, and the projection is configured to extend into and seal the opening when the sealing member is in the first orientation.

4. The lid of claim 2, wherein the first recess comprises fourth and fifth surfaces that are non-parallel to the first and second surfaces.

5. The lid of claim 2, wherein the first recess has a detent formed therein, and the intermediate portion of the sealing member comprises a projection extending therefrom that engages with the detent when the sealing member is in the second orientation to selectively to retain the sealing member in the second orientation.

6. The lid of claim 2, wherein the main body has an annular side surface that is substantially perpendicular to the first surface, and wherein the spout portion is disposed adjacent to a first portion of the side surface, and the recess is disposed adjacent to a second portion of the side surface circumferentially opposite the first portion.

7. The lid of claim 4, wherein the second recess comprises a sixth surface that is substantially parallel to the first and second surfaces.

8. The lid of claim 2, wherein the vent is spaced from the spout portion toward the second recess.

9. The lid of claim 2, wherein the sealing member is pivotably coupled to the main body by one or more pivot pins.

10. The lid of claim 2, wherein the sealing member, main body, and spout portion are integrally formed from a single, unitary piece of material.

11. The lid of claim 2, wherein the spout portion has an elliptical cross-sectional profile taken in a plane perpendicular to a longitudinal axis of the spout portion.

12. The lid of claim 11, wherein the spout portion has a frustoconical cross-sectional profile taken in a plane parallel to the longitudinal axis of the spout portion.

13. The lid of claim 12, wherein the intermediate portion extends from the base portion to the cap portion at an angle, and the angle is configured such that the intermediate portion is flush with the spout portion when the sealing member is in the first orientation.

14. The lid of claim 2, wherein an annular inner surface of the spout portion that defines the opening is radially tapered such that a portion of the inner surface disposed adjacent to the second surface is radially larger than a portion of the inner surface spaced from the second surface.

15. A reusable lid for a beverage container, comprising:

a main body having a raised nipple and a central recess; and a sealing member pivotally connected to the main body for pivoting about a pivot axis located substantially within the central recess, wherein the raised nipple includes a first surface having a drink-through opening and the sealing member has a second surface sealingly compatible with the first surface, wherein the sealing member is pivotable between a first orientation in which the first and second surfaces are in substantially parallel engagement to one another and the drink-through opening is sealed and a second orientation in which the first and second surfaces are not parallel to one another and the drink-through opening is exposed, wherein the central recess includes a deeper recess portion on a side of the lid opposite the nipple to receive the second surface of the sealing member in the second orientation, and wherein the deeper recess portion has a geometry compatible with the second surface such that at least a portion of the second surface rests within the deeper recess when the sealing member is in the second orientation.

16. The reusable lid of claim 15, wherein the pivot axis is located centrally on the main body so that the second surface pivots from one side of the lid proximate to the nipple to an opposite side of the lid.

17. The reusable lid of claim 15, wherein the sealing member has a step orientation, which includes the second surface, a leg portion and bridge portion interconnecting the second surface and leg portion.

18. The reusable lid of claim 15 wherein the second surface has a plug portion extending therefrom adapted to plug the drink-through opening in the first orientation.

* * * * *